Dec. 11, 1928.
E. E. BOLINGER
ELECTRIC WATER HEATER
Filed March 21, 1928
1,695,227
2 Sheets-Sheet 1
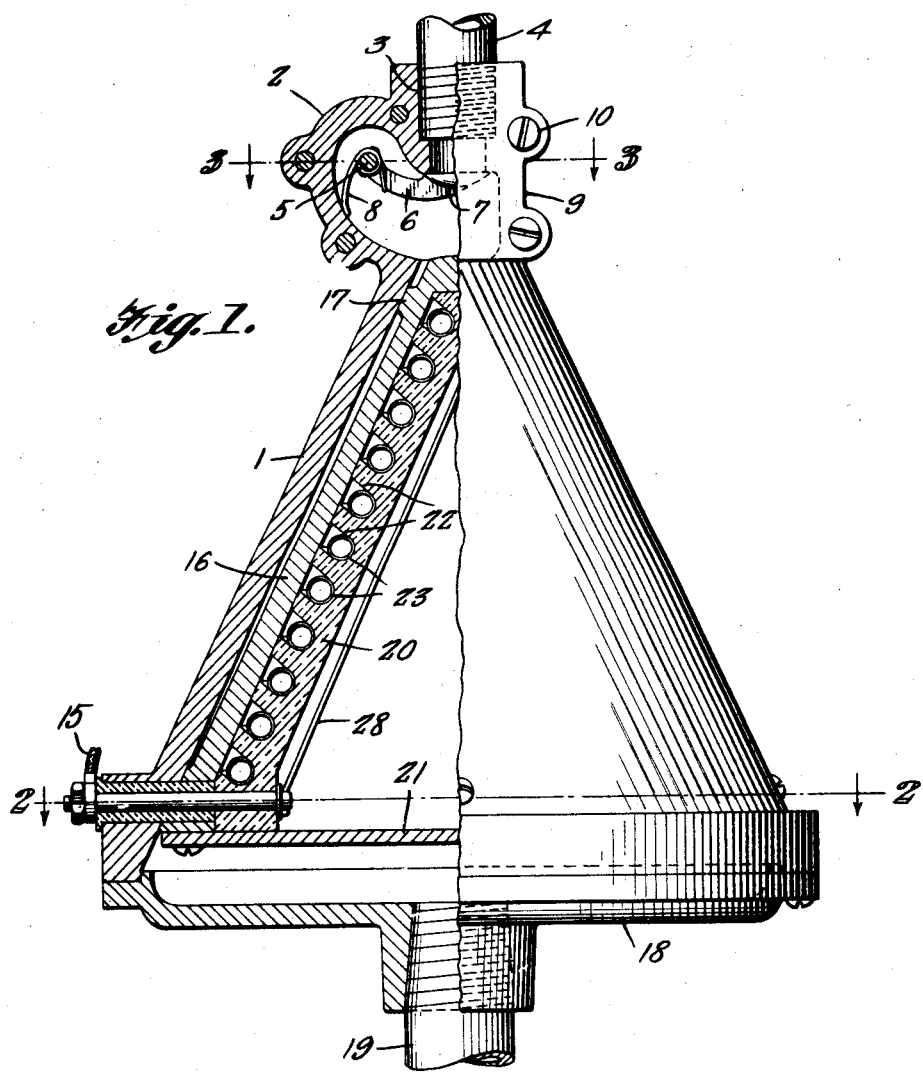
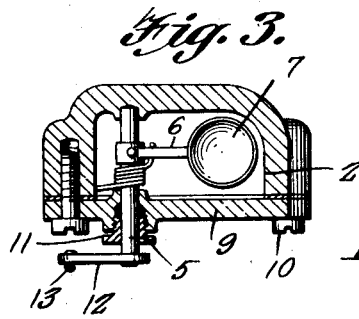
Ernest E. Bolinger, INVENTOR
BY Victor J. Evans ATTORNEY
WITNESS:

Dec. 11, 1928.

E. E. BOLINGER 1,695,227

ELECTRIC WATER HEATER

Filed March 21, 1928  2 Sheets-Sheet 2

Ernest E. Bolinger, INVENTOR

BY Victor J. Evans ATTORNEY

Patented Dec. 11, 1928.

1,695,227

UNITED STATES PATENT OFFICE.

ERNEST E. BOLINGER, OF EMMETT, IDAHO.

ELECTRIC WATER HEATER.

Application filed March 21, 1928. Serial No. 263,369.

This invention relates to an electric heater for heating water or other liquid, the general object of the invention being to provide a conical chamber of very small width through which the liquid passes, with electric means for heating one wall of the chamber so that the liquid will be heated to a high degree as it passes through the chamber.

Another object of the invention is to provide a switch for controlling the circuit of the electric heating means which is closed when the liquid starts to flow into the chamber and which is opened when the flow of liquid ceases.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is an elevation, with parts in section, of the invention.

Figure 3 is a section on line 3—3 of Figure 1.

Figure 2:
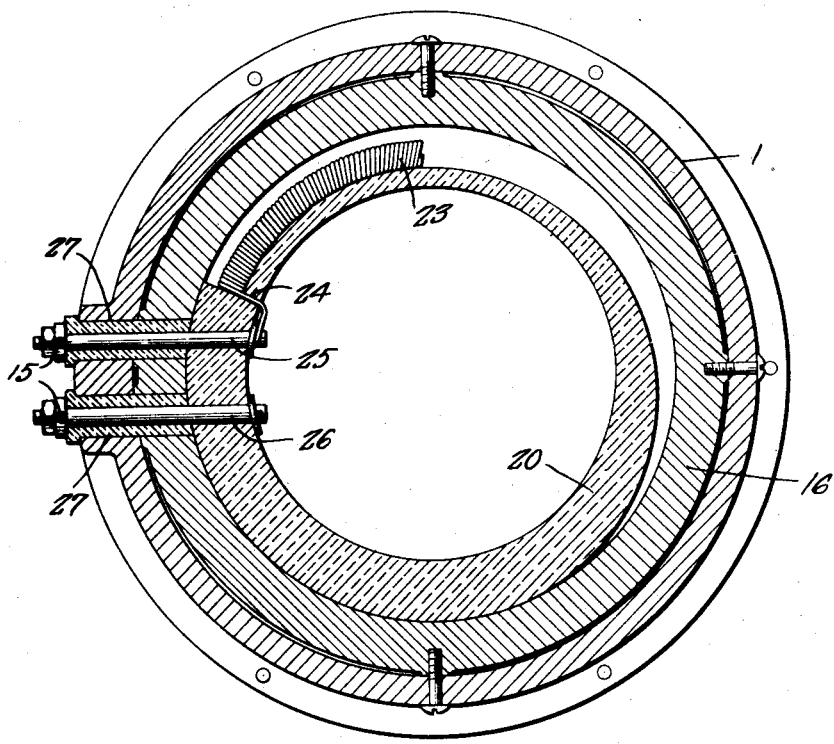
Figure 2 is a section on line 2—2 of Figure 1.
Figure 4:
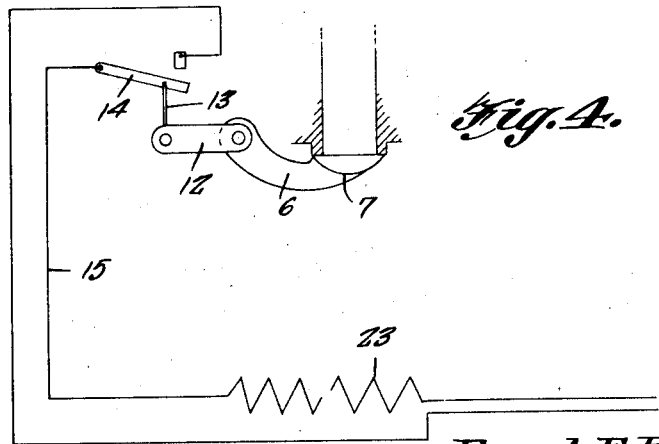
Figure 4 is a diagrammatic view of the circuit.

In these views, the numeral 1 indicates a conical casing, the small upper end of which is provided with an offset portion which forms a chamber 2, the inlet 3 of which is threaded to receive the threaded end of a pipe 4 which is connected to a source of liquid supply. A shaft 5 is arranged in the chamber and an arm 6 is fastened to the shaft, said arm having a circular head 7 thereon, the upper face of which is formed with a depression and this head is normally held in a position closing the lower end of the inlet by a spring 8 on the shaft. One wall of the chamber is formed by a plate 9 which is fastened to the casing by the screws 10 and one end of the shaft 5 passes through a packing gland 11 carried by the plate. The projecting end of this shaft carries an arm 12 which is connected by a link 13 to a switch arm 14 arranged in a circuit 15 so that when the arm 6 is moved downwardly by the liquid entering the chamber from the pipe 4, the switch will be moved to closed position and thus close the circuit.

A conical inner casing 16 is arranged in the casing 1, said casing 16 having the projections 17 thereon which act to space the casing 16 from the casing 1 so that the two casings form a liquid chamber of conical shape through which the liquid flowing into the chamber 2 from the pipe 4 will pass. The lower end of the casing 1 is closed by a member 18 which is detachably fastened to the lower end of said casing 1 and has a depression in its upper part for receiving the liquid passing from the conical chamber. An outlet pipe 19 is connected with the central part of the member 18.

A conical member 20 of porcelain or the like fits in the inner casing 16 and a plate 21 closes the lower end of the casing 16 and is suitably connected therewith and acts to hold the member 20 in said casing 16. The plate 21 has a tight fit with the casing 16 so that no liquid can enter the casing 16 and come in contact with the member 20. This member 20 has a spiral groove 22 on its exterior surface in which is located a heating coil 23. One end of the coil passes through a hole 24 formed in the member 20 and this end of the coil is connected to a post 25 which passes through the casings 1 and 16 and the member 20. A similar post 26 is arranged adjacent the post 25 and passes through the two casings and the member 20, these posts being insulated from the casings by the non-conducting material 27. The outer ends of these posts are connected with the circuit 15 and the upper end of the coil is connected by a conductor 28 which passes through a hole in the top of the member 20 and extends downwardly through said member and is connected with the post 26.

From the foregoing it will be seen that when a valve or other controlling means is opened to permit the liquid from the supply to enter the pipe 4, this liquid, by its pressure against the head of the arm 6, will swing said arm downwardly, thus partly rotating the shaft 5 to cause the arm 12 to close the switch 14. This will close the circuit to the heating coil 23 and the heat generated will heat the casing 16 so that the thin body of water in the chamber between the casings 1 and 16 will be heated as this water flows through the chamber from the chamber 2 to the lower end of the device. Thus the water will pass from the conical chamber in a highly heated condition and will pass through the pipe 19 to the point of use. As soon as the water ceases to flow from the pipe 4, the spring will return the arm 6 to its closed position and thus open the switch to break the circuit to the heating coil.

As will be seen, the heating element is entirely enclosed within the heater or boiler and while the device is mainly designed for heating water, it may be used for heating other fluids or for generating steam.

It is thought from the foregoing description that the advantages and novel features of my invention will be readily apparent.

It is to be understood that I may make changes in the construction and in the combination and arrangement of the several parts, provided that such changes fall within the scope of the appended claims.

What I claim is:—

1. A liquid heater comprising a conical casing having an offset part at its upper small end forming a chamber, an inlet pipe connected with the chamber, a member closing the lower end of the casing and forming a discharge chamber, a discharge pipe connected with the latter chamber, a second conical casing fitting within the first and having projections thereon for slightly spacing it from the first chamber to form a conical passage between the casings, the upper small end of the passage being in communication with the inlet chamber and the lower end of the passage being in communication with the discharge chamber, a conical member formed of non-conducting material fitting in the inner casing and having a spiral groove in its outer surface, a heating coil in said groove, a pair of posts passing through the two casings and the grooved member, means for connecting the ends of the coil to the inner ends of said posts, a circuit connected with the outer ends of said coils, a switch in said circuit, a shaft arranged in the inlet chamber, an arm on the shaft having a head, spring means for causing the head to normally lie in a position for closing the inlet to the inlet chamber and said arm being moved to open position by the liquid flowing into the chamber and means connected with the shaft for opening and closing the switch by the movement of the arm on the shaft.

2. A liquid heater of the class described comprising a conical casing having an inlet chamber at its upper small end and an outlet chamber at its lower end, a conical member fitting in the casing and slightly spaced therefrom to form a conical liquid passage, the upper end of which is in communication with the inlet chamber and the lower end of which is in communication with the outlet chamber, a second conical member formed of non-conducting material and fitting in the first member, with its outer surface contacting with the inner surface of said first member, said second member having a spiral groove in its outer surface, a heating coil arranged in the groove and a closure for the lower ends of the first and second conical members, said closure forming the top wall of the outlet chamber.

In testimony whereof I affix my signature.

ERNEST E. BOLINGER.